United States Patent

Ueno et al.

[15] 3,663,354

[45] May 16, 1972

[54] PRIMER FOR METALS

[72] Inventors: Hiroshi Ueno, Kawasaki-shi; Seihichi Kobayashi, Yokohama-shi, both of Japan

[73] Assignee: Toyo Seikan Kabushiki Kaisha, Tokyo-to, Japan

[22] Filed: July 23, 1969

[21] Appl. No.: 844,154

[52] U.S. Cl. ............................161/186, 161/215, 161/227, 260/831, 260/837 R
[51] Int. Cl. ................B32b 15/08, B32b 27/34, B32b 27/38
[58] Field of Search ..................161/215, 227, 186; 260/831, 260/837 R

[56] References Cited

UNITED STATES PATENTS

| | | | |
|---|---|---|---|
| R25,625 | 7/1964 | Been et al. | 161/186 |
| 2,712,001 | 6/1955 | Greenlee | 161/186 X |
| 2,962,468 | 11/1960 | Groves | 161/186 X |
| 2,970,077 | 1/1961 | Groves | 161/186 X |
| 3,006,113 | 10/1961 | Barnes et al. | 161/186 X |
| 3,007,828 | 11/1961 | Boyer et al. | 161/186 X |
| 3,011,909 | 12/1961 | Hart et al. | 117/72 |
| 2,864,791 | 12/1958 | De Groote et al. | 260/831 |
| 3,030,332 | 4/1962 | Lombardi et al. | 260/831 |
| 3,409,581 | 11/1968 | Hagan | 260/831 X |
| 3,454,418 | 7/1969 | Forsberg | 260/831 X |
| 3,488,314 | 1/1970 | Fuller | 260/831 X |
| 3,563,850 | 2/1971 | Stackhouse et al. | 260/831 X |

*Primary Examiner*—Harold Ansher
*Attorney*—Holman & Stern

[57] ABSTRACT

A primer which is adhesive to both metals and linear polyamides, and which is a precondensate of (1) a resol type phenolic resin prepared from a mixture of phenols comprising p-cresol and tri- or higher functional phenol and (2) an epoxy resin. A metal article coated with the primer having a linear polyamide coat thereon, and a bonded structure of prime-coated metal sheets bonded with a linear polyamide as a cement are also disclosed.

12 Claims, No Drawings

PRIMER FOR METALS

BACKGROUND OF THE INVENTION

This invention relates generally to a primer which is adhesive to both metal and linear polyamides and to uses thereof.

Primers presently available on the market for application of linear polyamides as coating on metal surfaces are accompanied by difficulties relating to mechanical strength and, accordingly they do not usually provide good bonding strength between metal and metal or between metal and polyamide.

It is also known that linear polyamides can be used as bonding agents or cements for metals or other substrates because they are tough in comparison with other plastics. Accordingly, they may be used by themselves or in admixture with plasticizers, with novolak type phenolic resins, or with epoxy resins and hardener therefor in the form of thermosetting cement. Modified polyamides wherein polymerizable monomers are grafted on the backbone of polyamides to form graft copolymers can be used as cements, and a bonding process which comprises heat-curing a cement which is a linear polyamide coated with heat-curable epoxy resins or diisocyanate is also known. However, these linear polyamides by themselves or in admixture with other components are less adhesive to metals, and linear polyamides modified to be heat-curable require much time to set. Grafted polyamides are expensive and impractical.

SUMMARY OF THE INVENTION

An object of the invention is to provide means to bond linear polyamides to metal.

A further object is to provide means to bond metal to metal with linear polyamide cements.

A still further object of the invention is to provide means to bond metal to metal in a short time.

Another object of the invention is to provide a primer which is adhesive to both metals and linear polyamides.

Still another object is to provide a metal article such as a sheet coated with linear polyamides.

A further object is to provide metal articles such as sheets bonded laminarly with linear polyamide cements.

A still further object of the invention is to provide a container made of sheet metal which has on the body or barrel thereof a seam that is fabricated by means of bonding instead of soldering.

The foregoing and other objects will become more clearly apparent hereinafter.

These objects are accomplished by a primer which comprises a curable precondensate of a resol type phenolic resin and an epoxy resin, in which said resol type phenolic resin is a condensate of formaldehyde and a mixture of 50–90 percent by weight of p-cresol and 50–10 percent by weight of at least one multifunctional phenolic compound which is at least trifunctional, and said epoxy resin is a condensate of p,p'-dihydroxyl-diphenyl-alkane and epihalohydrin.

The primer in the form of a solution in an aromatic or aliphatic solvent is coated on the surface of metal articles such as degreased or cleaned ferrous sheets, aluminum sheets, steel sheets plated with zinc, tin, chromium and aluminum and steel sheets treated with chromic acid or phosphoric acid, and is heated so as to evaporate off the solvent used and to undergo further curing.

The prime-coated metal sheet thus obtained is then coated with a linear polyamide. In one embodiment of the invention, the prime-coated surface of a metal sheet is coated with a linear polyamide in the form of a solution, the solvent of which is to be evaporated off. In another embodiment of the invention, a linear polyamide is coated onto the prime-coated surface in the molten state. In this latter case, the linear polyamide coat may be formed by heat-adhesion of the polyamide which has been applied in the form of film or powder or flame-spraying of the polyamide powder onto the prime-coated surface.

Adhesion of the linear polyamide to the prime-coated metal surface is improved if the linear polyamide is heated under pressure at or above the melting temperature of the polyamide used. A heating time as short as 30–200 milliseconds is sufficient to provide improved adhesion.

The linear polyamide coat of the thus coated metal article can be employed as a cement for another prime-coated metal article. For example, a metal sheet such as electrolytically chromated steel sheet coated with linear polyamide in the above described manner is superimposed over another similar sheet or over a metal sheet which has been coated only with the primer, and the resulting laminated assembly is heated under pressure at or above a melting temperature of the linear polyamide used for a short time of the order of 30 to 200 milliseconds. The prime-coated metal sheet may also be bonded to each other by heating under pressure a laminated assembly having a separate layer of linear polyamide film or powder between the prime-coated metal sheets for a short time of the order of a few seconds.

The bonding of the present prime-coated metal sheets, in which a linear polyamide is employed as a cement, is achieved in such a very short time and the bonding or peeling-resistant strength between the metal sheets is of such high value that this bonding technique can be utilized to replace prior or conventional soldering practised in making side seams of sheet metal containers, and thus automatic canning, which requires high speed side seaming, will accordingly be made possible.

DETAILED DESCRIPTION OF THE INVENTION

The resol type phenolic resin to be used in preparation of the present primer is a condensate of formaldehyde and a mixture of from 50 to 90 percent by weight of p-cresol and from 50 to 10 percent by weight of at least one multifunctional phenolic compound which is at least trifunctional. The multifunctional phenolic compound which is at least trifunctional is a phenolic compound which has at least three positions capable of reacting with formaldehyde to form methylol groups. The positions capable of reacting with formaldehyde may ordinarily be ortho and para with regard to a given hydroxyl group.

The preferable phenolic compounds are mono- or dihydroxyl compounds of the formula

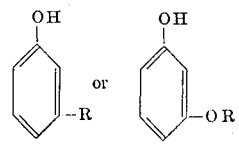

wherein R is hydrogen or a hydrocarbon group which has a carbon number of from one to eight and is preferably aliphatic, or the formula

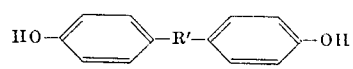

wherein R' is $-CH_2-$, $-CH(CH_3)-$, $-C(CH_3)_2-$, $-C(CH_3)(C_{25})-$, or $-O-$. The compounds of the formulas may be substituted in their position meta with respect to hydroxyl group or groups by a hydrocarbon having a carbon number of from one to eight. The Examples of these compounds are phenol, m-cresol, resorcinol, m-methoxy phenol, m-ethoxy phenol, m-octyl phenol, p,p'-dihydroxyl-diphenyl-dimethyl methane (Bisphenol A), and the like.

The resol type condensate of the mixed phenols and formaldehyde may be prepared in a conventional manner. For example, mixed phenols are dissolved in a 37 percent aqueous solution of formaldehyde, and the resulting solution is heated in the presence of an alkaline catalyst added at 70° to 100° C for 1 to 5 hours to condense the phenols with formaldehyde. The resin content of the reaction product is extracted with a suitable solvent such as a ketone to produce a resol type phenolic resin. The resins should preferably be water-free.

It is to be understood that the terms "to condense" and "-condensate" are used for the sake of convenience in order to express the phenomena involved in the reaction between formaldehyde and phenols to form resol type reaction products and also in the reaction between polyphenols and epihalohydrin to form a so-called epoxy resin and the reaction of the resol type phenolic resin and the epoxy resin although these reactions should be called "addition" or "addition condensation."

The epoxy resin to be combined with the resol type phenolic resin may have the following formula:

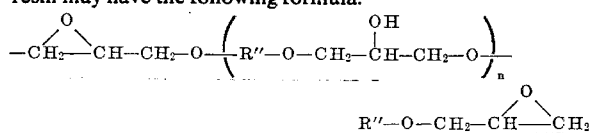

wherein R'' is a residue remaining after condensation of p,p'-dihydroxy-diphenyl-alkane. The epoxy resin of the formula is a reaction product of bisphenol having a formula HO—R''—OH such as bisphenol-A wherein alkane moiety of the dihydroxyl diphenyl alkane is dimethyl methane and epihalohydrin such as epichlorohydrin, "n" being, in general, 0 to 12.

The resol type phenolic resin and the epoxy resin are heated is solution to form a pre-condensate, which is still capable of further condensing, to be used in the present primer. It is preferable that less than 50 percent, preferably 10 – 30 percent, of epoxy groups which were originally present in the epoxy resin used be made to react with the hydroxyl groups of the resol type phenolic resin used through the pre-condensation. The pre-condensate should preferably be soluble in organic solvents.

The choice of the linear polyamide to be used as cement for the prime-coated metal articles does not constitute an essential part of this invention. Almost any linear polyamide is usable, but a melting temperature thereof should preferably be between an ambient temperature and a degrading or a melting temperature of materials concerned in the coating or bonding procedure such as the melting temperature of tin in the case of bonding tinned plate. Examples of such polyamides are disclosed in U.S. Pat. No. 2,962,468, second column, lines 8–24, and are, for example polyhexamethylene adipamide, polyhexamethylene sebacamide, 6-amino-caproic acid polymers, 11-amino-undecanoic acid polymers, 12-amino-lauric acid polymers, and copolymers of the dicarboxylic acids, diamines and amino acids used in the foregoing polymers. It is desirable that the linear polyamides to be used as cement have relative viscosities greater than 1.5 in the form of solutions thereof of 1 percent concentration in 98 percent concentrated sulfuric acid. Our experiments have shown that linear polyamides having relative viscosities of less than 1.5 are brittle in nature and are not sufficiently adhesive to provide satisfactory bonding strength.

Peeling strength is dependent on many factors, the principal factors being considered below with respect to examples of procedures.

1. Type of phenol used in admixture with p-cresol and ratio of p-cresol to the phenol.

Electrolytically chromated steel sheets sold under trade name of "Hi Top" by Toyo Kohan Kabushiki Kaisha, Japan, are bonded to each other.

Linear polyamide as cement is polymers of 12-amino-lauric acid and the relative viscosity of which is 2.7 (1 percent concentration of solution in 98 percent conc. sulfuric acid) is used.

A primer is prepared as follows: 100g of phenol listed in Table 1 is dissolved in 130g of 37 percent formaldehyde aqueous solution, and the resulting solution is caused to react in the presence of an alkaline catalyst at 95° C for approximately 3 hrs. At the end point of the condensation reaction, a solidified resinous mass on a metal plate can be peeled off easily, which resinous mass has been prepared by taking a sample of the reaction mixture on the metal plate to cool rapidly to room temperature and to solidify the resinous content thereof. The reaction product is then extracted with 250 g of mixed solvent consisting of ketones, esters and alcohols and washed with water a number of times, and the condensate thus extracted is aged at 50° C for 24 hrs.

The resol type phenolic resin thus obtained is mixed with an epoxy resin (Epikote 1007) solution, the solid content of which is 30 percent, the ratio of solid content of the phenolic resin to solid content of the epoxy resin being 3:7. The mixture is heated under reflux at 110° C for approximately 3 hrs. thereby to produce a primer of this invention. At the end point of the reaction, the baked film of the reaction product is transparent.

The primer thus obtained is roll-coated on the surface of the steel sheet "Hi Top," and the coat is cured at 210° C for 10 min. in an oven. The thickness of the cured coat of the primer is approximately 5 $\mu$.

A film of polymers of 12-aminolauric acid of a thickness of approximately 100 $\mu$ is then applied onto the prime-coated surface to be bonded of the steel sheet. The steel sheet thus coated is heated at approximately 230° C and is pressed for 50 milliseconds against another identical steel sheet, the polyamide surfaces of both sheets being pressed together, thereby to produce a bonded laminated structure of the sheets which is used as a specimen to be tested.

The peeling strengths of various specimens produced in the above described manner in actual practice are recorded in Tables 1 and 2.

TABLE 1

| Type of phenols used (% by weight in the mixed phenol) | | Peeling strength at 20° C (Kg/cm) |
|---|---|---|
| phenol | 100 | 10 |
| p-cresol | 100 | 15 |
| m-cresol | 100 | 10 |
| p-tert-butylphenol | 100 | 8 |
| bisphenol-A | 100 | 12 |
| p-cresol | 70 | 25 |
| m-cresol | 30 | |
| p-cresol | 80 | 26 |
| m-cresol | 20 | |
| p-cresol | 75 | 26 |
| bisphenol-A | 25 | |
| p-cresol | 80 | 25 |
| resorcinol | 20 | |
| p-cresol | 80 | 27 |
| m-methoxyphenol | 20 | |
| p-cresol | 70 | 26 |
| phenol | 30 | |
| p-cresol | 70 | 24 |
| m-ethylphenol | 30 | |
| p-cresol | 60 | 23 |
| m-ethoxyphenol | 40 | |
| p-cresol | 60 | 21 |
| m-octyloxyphenol | 40 | |
| p-cresol | 70 | 27 |
| phenol | 20 | |
| m-cresol | 10 | |
| p-cresol | 70 | 10 |
| p-tert-butylphenol | 30 | |
| p-cresol | 70 | 8 |
| p-nonylphenol | 30 | |
| m-cresol | 70 | 10 |
| phenol | 30 | |
| (no primer) | — | 7 |

TABLE 2

| Type of multifunctional phenols (A) used in admixture with p-cresol (B) and ratio of B/A by weight | | Peeling strength at 20° C (Kg/cm) |
| --- | --- | --- |
| m-cresol | 100/0 | 9 |
| " | 90/10 | 18 |
| " | 70/30 | 25 |
| " | 50/50 | 20 |
| " | 30/70 | 14 |
| " | 0/100 | 10 |
| bisphenol-A 50 parts +phenol 50 parts both by weight | 90/10 | 20 |
| " | 70/30 | 26 |
| " | 50/50 | 23 |
| " | 30/70 | 12 |
| " | 0/100 | 11 |

The results recorded in Table 1 indicate that higher peeling strength is obtained only in the case of the combinations of p-cresol and a multifunctional phenol which is at least trifunctional.

The results recorded in Table 2 indicate that higher peeling strength is obtained when the weight ratio of p-cresol to the multi-functional phenols is in the range of 50:50 to 90:10.

2. Ratio of the phenolic resin to epoxy resin

Tests were run wherein the weight ratio of the phenolic resin to the epoxy resin was varied. The mixture of phenols used in the preparation of the phenolic resin is p-cresol and m-cresol, the weight ratio of p-cresol to m-cresol being 70:30. The types of epoxy resin, metal sheet, and cement and bonding procedure used are identical to those used in the tests of Table 1.

TABLE 3

| Phenolic resin (% by weight) | Epoxy resin (% by weight) | Peeling strength at 20° C (Kg/cm) |
| --- | --- | --- |
| 0 | 100 | 3 |
| 10 | 90 | 10 |
| 20 | 80 | 22 |
| 30 | 70 | 25 |
| 50 | 50 | 22 |
| 60 | 40 | 18 |
| 80 | 20 | 8 |
| 100 | 0 | 2 |

The results recorded in Table 3 indicate that higher peeling strength is obtained when the weight ratio in the phenolic resin is in the range of 20:80 to 60:40.

3. Epoxy equivalent

The epoxy equivalent is relative to the molecular weight of an epoxy resin and is calculated by dividing the molecular weight of an epoxy resin by the number of epoxy rings thereof. The greater the epoxy equivalent is, the higher is the molecular weight.

Experiments were run wherein the epoxy equivalent of the epoxy resin used in the primer was varied, other variables, viz., ratios in the mixture of phenols and ratios of phenolic resin to epoxy resin, being kept within the optimum ranges recorded in Table 1, 2 and 3.

It was found that higher bonding strength is obtained when epoxy equivalent is within the range of 450 to 5,500. Higher bonding strength is not obtained when epoxy equivalent is less than 450, and the product is impractical as a primer because of the low reactivity of the epoxy resin used when the epoxy equivalent is over 5,500.

Any procedure can be employed to apply the primer onto metal surfaces. For example, the primer in the form of a solution is applied onto the surface of a metal article such as a metal sheet by brushing, spraying, dipping or roll-coating, and the coat produced on the metal is heated to condense or be cured at 170° to 230° C for 3 to 30 min., for example. Thickness of the cured coat is preferably 1 to 20 microns.

A linear polyamide can be applied onto the thus prime-coated surface by any technique of application. In one preferred embodiment of the invention, the polyamide is applied onto the prime-coated surface in the form of film, and the film is fused and caused to adhere to the prime-coated surface under heat and pressure. The time required to cause the polyamide film to adhere thus to the prime-coated surface under heat and pressure can be made as short as possible as permitted by the heating procedure employed. In another embodiment of the invention, the polyamide is melt extruded in the form of molten film onto the prime-coated surface. The polyamide can, of course, be applied in the form of a solution, which application is followed by evaporation of the solvent used.

As stated hereinbefore, the metal sheet, thus provided with a linear polyamide coat thereon, can be bonded under heat and pressure to each other or to a metal sheet which is coated only with the primer.

In practice, the metal sheet having a polyamide coat thereon is heated to melt the polyamide and superimposed onto another identical sheet with the polyamide surface of both sheets in contact, and then pressure is applied upon the laminated structure thus formed. The time required to cause the polyamide coat to adhere to another prime-coated surface is very short, because the polyamide requires only melting by the heating. The prime-coated metal sheet without a linear polyamide coat thereon can also be bonded to each other, by means of a separate linear polyamide "cement."

The following examples are set forth merely as further illustrations of the present invention and are not intended to limit the scope thereof.

EXAMPLE 1

30 g of m-cresol and 70g of p-cresol were dissolved in 130g of 37 percent aqueous formaldehyde solution, and the resulting solution was caused to react in the presence of an alkaline catalyst at 95° C for 3.5 hrs. The resulting condensation product was then extracted by 250g of a solvent mixture consisting of 20 parts of methyl-iso-butylketone, 20 parts of cyclohexanone, 20 parts of butylcellosolve, 20 parts of toluene and 5 parts of n-butanol, washed with water a number of times, aged for 24 hours., and made water free. From the condensation product thus produced, a solution of resol type phenolic resin dissolved in the solvent mixture was prepared, the solid content of the solution being 30 percent.

Epikote 1007, an epoxy resin, was dissolved in the solvent mixture specified above.

Both solutions were mixed together to produce a solution in which the weight ratio of the phenolic resin to epoxy resin was 3:7, and the resulting solution was heated under reflux at approximately 110° C for 3 hrs. to produce a primer in the form of a solution.

"Hi Top," a steel sheet, was brush-coated with the primer solution, and dried to cure the primer at 210° C for 12 min. The thickness of the cured coat of the primer was 8–10 $\mu$.

A film of a polymer of 12-amino-lauric acid, of a thickness of 50$\mu$ and relative viscosity of the polymer of 2.3, was laid upon the part of the prime-coated surface of the metal to be bonded and was pressed to the surface under heat at 230° C for 2 sec. by means of a hot plate having a surface coated with silicone resins.

One of the metal sheets having the polyamide coat thereon was superimposed upon another with the polyamide surfaces of both sheets in contact. The assembly thus formed was heated by means of high-frequency heating for 50 milliseconds and was pressed, and then cooled.

The peeling strength of several samples of the bonded laminated structure of the metal sheets thus produced was 23–28 kg/cm, averaging 25 kg/cm.

EXAMPLE 2

The procedure for preparing the primer of Example 1 was followed, except that a mixture of p-cresol and bisphenol-A was used as a mixed phenol, and Epikote 1009 was used as epoxy resin.

The primer solution thus produced was applied as a coating on a cleaned aluminum sheet and was heat-cured at 210° C for 10 min. The thickness of the cured primer coat was 5 – 10 $\mu$.

The aluminum sheet was heated at 260° C, and then a film of polymer of 6-amino-caproic acid was applied thereonto. The thickness of the film was 50$\mu$ and the relative viscosity of the polyamide was 2.45.

The aluminum sheet having the polyamide coat thereon was bonded to another identical sheet under pressure at 250° C for 50 milliseconds, and cooled.

The peeling strengths of samples of the bonded structure of the sheets were 25 – 30 kg/cm. The peeling strength exhibited by the bonding at 230° C for 5 seconds was 25 – 30 kg/cm.

EXAMPLE 3

The procedure for preparing the primer of Example 1 was followed except that a mixture of 70 parts of p-cresol, 20 parts of phenol and 10 parts of bisphenol-A was used as the mixed phenol and Epon 1007 was used as the epoxy resin.

The primer thus prepared was applied as a coating on a tinned plate and heat-cured at 210° C for 12 min. The thickness of the resulting primer coat is 5 – 8 $\mu$.

The prime-coated tinned plate was then coated with a solution of a linear copolyamide composed of hexamethylene diamine, adipic acid, sebacic acid and 6-amino-caproic acid in a solvent mixture consisting of methanol and chloroform, the solid content of which was 30 percent, and the solvent used was then evaporated off. The thickness of the polyamide was controlled to be approximately 30 $\mu$.

The tinned plate is placed upon another identical plate and heated at 200° C for 3 sec. by means of hot plate. The peeling strength of the samples of the laminated structure of the sheets thus bonded was 16–20 kg/cm.

The peeling strength in the case where a galvanized iron sheet was substituted for the tinned plate in the foregoing test was 25–30 kg/cm.

The peeling strength was 15 – 20 kg/cm in the case where a tinned plate was coated with the primer, coated with the copolyamide and heated at 200° C, and the tinned plate thus prepared was bonded to another identical plate with the molten copolyamide surfaces thereof in contact under heat and pressure for 70 milliseconds and cooled.

We claim:

1. In a primer for improving adhesion between a metal and a linear polyamide cement in the molten state, said primer consisting essentially of a heat-curable precondensate of a phenolic resol resin and an epoxy resin of a condensation product of bisphenol A and epichlorhydrin having an epoxy equivalent of 450–5,500, the improvement comprising the use of a phenolic resol resin of a condensation product of formaldehyde and a mixture of from 50–90 percent by weight of p-cresol and from 50–10 percent by weight of a multi-functional phenol selected from the group consisting of phenol, m-cresol, bisphenol A, m-ethylphenol, m-methoxyphenol, m-ethoxyphenol, m-octyloxyphenol, and mixtures thereof, and the weight ratio of the phenolic resol resin to the epoxy resin being in the range between 20:80 and 60:40.

2. The improvement as claimed in claim 1 in which the quantity of the remaining reactive epoxy groups in the heat curable precondensate corresponds to more than 50 percent of that of the epoxy groups of the initial epoxy resin.

3. The improvement as claimed in claim 1 in which said linear polyamide is a member selected from the group consisting of polyhexamethylene adipamides, polyhexamethylene sebacamides, 6-amino caproic acid polymers, 11-amino undecanoic acid polymers, 12-amino lauric acid polymers and interpolymers of monomers in the foregoing polymers, each having a relative viscosity greater than 1.5 at a 1 percent concentration in 98 percent concentrated sulfuric acid.

4. In a primer for improving adhesion between a metal and a linear polyamide cement in the molten state, said primer consisting essentially of a heat-curable precondensate of a phenolic resol resin and an epoxy resin of a condensation product of bisphenol A and epichlorhydrin having an epoxy equivalent of 450–5,500, the improvement comprising the use of a phenolic resol resin of a condensation product of formaldehyde and a mixture of from 50–90 percent by weight of p-cresol and from 50–10 percent by weight of bisphenol A, and the weight ratio of the phenolic resol resin to the epoxy resin being in the range between 20:80 and 60:40.

5. The improvement as claimed in claim 4 in which the quantity of the remaining reactive epoxy groups in the heat curable precondensate corresponds to more than 50 percent of that of the epoxy groups of the initial epoxy resin.

6. The improvement as claimed in claim 4 in which said linear polyamide is a member selected from the group consisting of polyhexamethylene adipamides, polyhexamethylene sebacamides, 6-amino caproic acid polymers, 11-amino undecanoic acid polymers, 12-amino lauric acid polymers and interpolymers of monomers in the foregoing polymers, each having a relative viscosity greater than 1.5 at a 1 percent concentration in 98 percent concentrated sulfuric acid.

7. In a primer for improving adhesion between a metal and a linear polyamide cement in the molten state, said primer consisting essentially of a heat-curable precondensate of a phenolic resol resin and an epoxy resin of a condensation product of bisphenol A and epichlorhydrin having an epoxy equivalent of 450–5,500, the improvement comprising the use of a phenolic resol resin of a condensation product of formaldehyde and a mixture of 75 percent by weight of p-cresol and 25 percent by weight of bisphenol A, and the weight ratio of the phenolic resol resin to the epoxy resin being 30:70.

8. The improvement as claimed in claim 7 in which the quantity of the remaining reactive epoxy groups in the heat-curable precondensate corresponds to more than 50 percent of that of the epoxy groups of the initial epoxy resin.

9. The improvement as claimed in claim 7 in which said linear polyamide is a member selected from the group consisting of polyhexamethylene adipamides, polyhexamethylene sebacamides, 6-amino caproic acid polymers, 11-amino undecanoic acid polymers, 12-amino lauric acid polymers and interpolymers of monomers in the foregoing polymers, each having a relative viscosity greater than 1.5 at a 1 percent concentration in 98 percent concentrated sulfuric acid.

10. In a primer for improving adhesion between a metal and a linear polyamide cement in the molten state, said primer consisting essentially of a heat-curable precondensate of a phenolic resol resin and an epoxy resin of a condensation product of bisphenol A and epichlorhydrin having an epoxy equivalent of 450–5,500, the improvement comprising the use of a phenolic resol of a condensation product of formaldehyde and a mixture of (1) from 50–90 percent by weight of p-cresol and (2) from 50–10 percent by weight of a mixture of bisphenol A 50 parts and phenol 50 parts both by weight, and the weight ratio of the phenolic resol resin to the epoxy resin being 30:70.

11. The improvement as claimed in claim 10 in which quantity of the remaining reactive epoxy groups in the heat-curable precondensate corresponds to more than 50 percent of that of the epoxy groups of the initial epoxy resin.

12. The improvement as claimed in claim 10 in which said linear polyamide is a member selected from the group consisting of polyhexamethylene adipamides, polyhexamethylene sebacamides, 6-amino caproic acid polymers, 11-amino undecanoic acid polymers, 12-amino lauric acid polymers and interpolymers of monomers in the foregoing polymers, each having a relative viscosity greater than 1.5 at a 1 percent concentration in 98 percent concentrated sulfuric acid.

* * * * *